March 2, 1954     K. H. BLACK ET AL     2,671,211

REMOTE METER READING ATTACHMENT FOR INACCESSIBLE METERS

Filed Aug. 9, 1951

K. H. Black
R. S. Winters
INVENTORS,

BY *C. A. Snow & Co.*
ATTORNEYS.

Patented Mar. 2, 1954

2,671,211

UNITED STATES PATENT OFFICE 2,671,211

REMOTE METER READING ATTACHMENT FOR INACCESSIBLE METERS

Karl H. Black and Roy S. Winters,
Muskegon, Mich.

Application August 9, 1951, Serial No. 241,066

1 Claim. (Cl. 340—345)

This invention relates to an attachment designed for use in connection with meters commonly employed in metering liquids, the primary object of the invention being to provide an attachment which is so constructed and arranged that remote recordings of the liquid metered may be made.

An important object of the invention is to provide an attachment for recording the quantity of liquid metered, to the end that reading outside of a building in which a meter is located, or readings of an inaccessible meter may be made.

A further important object of the invention is to provide a device of this character which may be readily and easily attached to meters of known construction commonly employed in metering liquids.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing.

Figure 1:
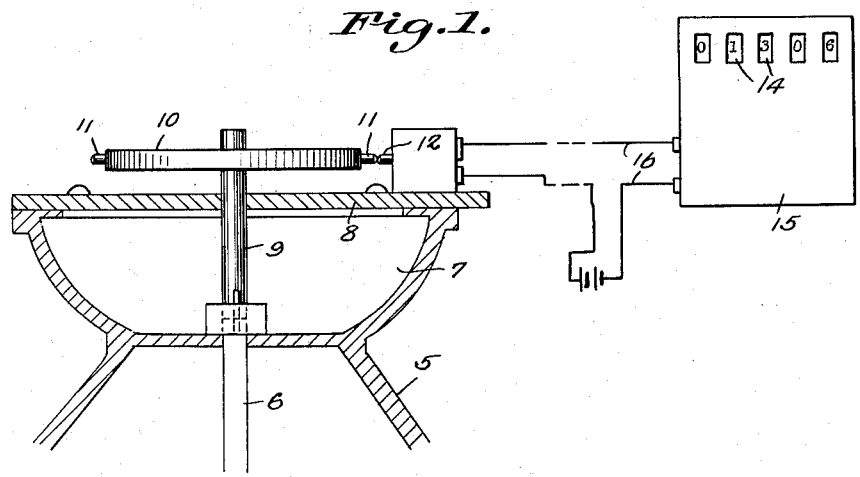
Figure 1 is a vertical sectional view through a meter casing illustrating the attachment as connected with the main shaft of the meter for controlling the auxiliary meter.
Figure 2:
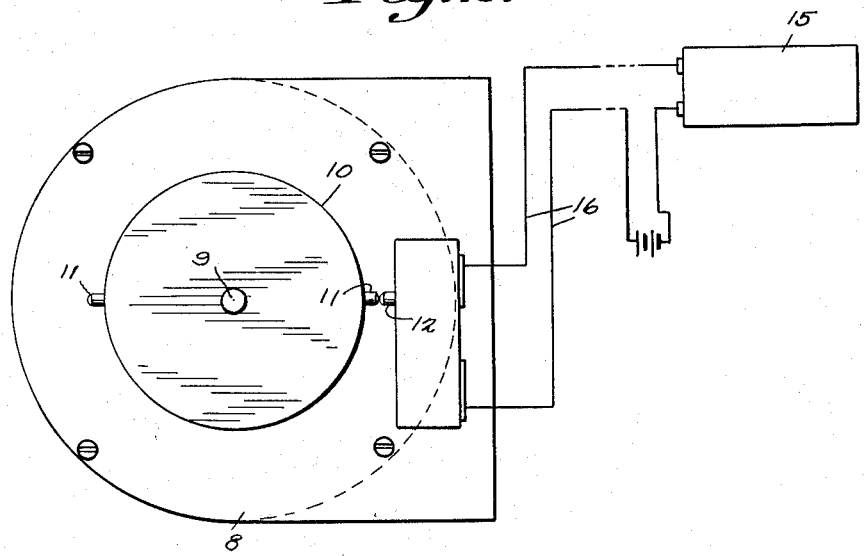
Fig. 2 is a plan view of the attachment.

Referring to the drawing in detail, the reference character 5 indicates the housing of a conventional meter, which includes a vertical operating shaft 6 that extends into the upper section 7 of the meter housing.

The attachment constituting the subject matter of the present invention includes a supporting plate indicated by the reference character 8 which is secured to the upper surface of the upper section of the meter housing, the supporting plate providing a support for vertical shaft 9 which is connected with the upper end of the vertical operating shaft 6, as clearly shown by Fig. 1 of the drawing.

The shaft 9 extends through a bearing opening formed in the supporting plate 8 and terminates a substantial distance above the plate 8, where it is supplied with the disc 10 formed with cam contact pins 11 that cooperate with the pin 12 extending from the microswitch 13, in such a way that as the disc 10 rotates, the contact pins 11 engaging the pin 12 of the microswitch, will close a circuit in the microswitch, operating the electrically controlled indicating discs 14 of the magnetic counter 15 which is in circuit with the microswitch, through the wires 16. It will of course be understood that the magnetic counter will be supported remote from the meter, and is primarily used for making remote recordings when the meter is inaccessible, as within a building.

In the operation of the device, the shaft 9 is rotated as the shaft 6 rotates in metering the liquid passing through the meter, which movement rotates the disc 10, causing the pins 11 to cooperate with the pin 12 of the microswitch, completing a circuit with each half rotation of the disc, and causing the operation of the magnetic counter, which is of conventional and well known structure.

From the foregoing it is believed that due to the construction shown and described, the operation and construction of applicant's attachment will be clearly obvious, and that further detail description of the operation and construction is unnecessary.

Having thus described the invention, what is claimed is:

The combination with a fluid meter having a dial housing and a main operating shaft extending into said dial housing, of a remote reading device for such meter, comprising a vertical attachment shaft adapted to be secured on one end of the main operating shaft in longitudinal axial alignment therewith, a supporting plate having a central opening, secured to said dial housing, in which the attachment shaft operates, a disc secured on said attachment shaft rotatable therewith, above said supporting plate, contact pins extending laterally from the periphery of said disc, and said contact pins adapted to engage switch actuating pins of a switch mounted on the supporting plate, operating such switch.

KARL H. BLACK.
ROY S. WINTERS.

References Cited in the file of this patent

UNITED STATES PATENTS

| Number | Name | Date |
|---|---|---|
| 427,014 | Roberts | Apr. 29, 1890 |
| 1,770,804 | Price | July 15, 1930 |
| 2,384,792 | Brown | Sept. 18, 1945 |
| 2,498,927 | Pugh | Feb. 28, 1950 |